United States Patent [19]

Borrelli et al.

[11] Patent Number: 4,840,655
[45] Date of Patent: Jun. 20, 1989

[54] METHOD FOR MAKING COLORED PHOTOCHROMIC GLASSES

[75] Inventors: Nicholas F. Borrelli, Elmira; Brent M. Wedding, Corning, both of N.Y.

[73] Assignee: Corning Glass Works, Corning, N.Y.

[21] Appl. No.: 161,093

[22] Filed: Feb. 26, 1988

[51] Int. Cl.$^4$ ............................................. C03C 4/06
[52] U.S. Cl. ................................. 65/30.11; 65/32.3; 501/13
[58] Field of Search ................. 65/30.11, 32.3; 501/13

[56] References Cited

U.S. PATENT DOCUMENTS

| | | | |
|---|---|---|---|
| 3,208,860 | 7/1962 | Armistead et al. | 106/54 |
| 3,892,582 | 7/1975 | Simms | 106/52 |
| 3,920,463 | 11/1975 | Simms | 106/54 |
| 4,125,404 | 11/1978 | Araujo et al. | 106/54 |
| 4,125,405 | 11/1978 | Araujo et al. | 106/54 |
| 4,190,451 | 2/1980 | Hares et al. | 106/47 |
| 4,240,836 | 12/1980 | Borrelli et al. | 106/47 |
| 4,537,612 | 8/1985 | Borrelli et al. | 65/30.11 |
| 4,757,034 | 7/1988 | Prassas | 501/13 |

OTHER PUBLICATIONS

N. F. Borrelli et al., "Photoinduced Optical Anisotrophy and Color Adaptation in Silver-Containing Glasses", Appl. Phys. Lett., 34 (6), pp. 375–397 (1979).

Primary Examiner—Arthur Kellogg
Attorney, Agent, or Firm—Kees van der Sterre

[57] ABSTRACT

An optically activated bleaching process effective to permanently modify the color of surface-colored silver halide-containing photochromic glasses produced by thermal reduction treatments is described, wherein the glass is coincidentally exposed, for an effective time interval, to (i) a source of high energy light and (ii) a heat source. The process reduces the relatively strong absorption peaks characteristic of the initially colored glass, resulting in a permanent bleached appearance.

3 Claims, 2 Drawing Sheets

METHOD FOR MAKING COLORED PHOTOCHROMIC GLASSES

BACKGROUND OF THE INVENTION

The present invention relates to a method for coloring or tinting photochromic glass, and more particularly to a method for treating photochromic glasses to modify the coloration induced therein by thermal reduction treatments.

Photochromic glasses may be generally characterized as glasses which darken upon exposure to actinic radiation, e.g., ultraviolet light, and which fade in color upon the removal of the activating light. Such glasses have been widely commercialized for the manufacture of ophthalmic lens blanks which will darken under bright outdoor conditions and fade in shade or indoors. Sunglass lenses have also been made of photochromic glasses of this type.

All of the commercially important photochromic glasses are glasses which contain a precipitated microcrystalline silver halide phase. It is this phase which is considered to cause the reversible darkening of the glass under exposure to light. U.S. Pat. No. 3,208,860 provides the basic description of this family of glasses. Subsequent work has resulted in the development of many new families of photochromic glasses exhibiting faster darkening and/or fading response. U.S. Pat. No. 4,190,451, for example, provides a description of some recently developed photochromic glasses of this type.

Photochromic glasses exhibiting a fixed color or tint in the undarkened state have also been commercially developed. Such products have included glasses containing conventional glass colorants, as well as glasses wherein coloration is imparted by treatment of the glass after manufacture with a coloring surface treatment, rather than by the inclusion of glass colorants in the composition. U.S. Pat. Nos. 3,892,582 and 3,920,463, for example, disclose thermal reduction treatments useful for imparting yellow surface colors to photochromic glasses, while U.S. Pat. No. 4,240,836 describes a modified thermal reduction treatment which permits the development of a broader range of colors in this type of glass.

A coloration mechanism which has been postulated for these thermal reduction treatments is the growth of light-absorbing silver metal particles on or near the silver halide crystallites in the glass. Changes in the size and/or configuration of these particles may be responsible for the variations in coloration which are observed.

The effects of optical bleaching on photochromic glasses have long been of interest. U.S. Pat. No. 4,125,404, for example, describes a color adaptation effect observed when a photochromic glass article darkened by exposure to actinic radiation is coincidentally bleached with colored light. The original darkened color of such a glass, which tends to be neutral due to broad-band absorption of the darkened photochromic phase, is permanently modified by such a bleaching treatment such that the darkened color approaches the color of the bleaching radiation.

Optical bleaching has also been employed to modify the color observed in silver halide-containing glasses exhibiting "additive coloration," i.e., color attributable to the presence of permanent absorbing silver particles in the glass. U.S. Pat. No. 4,125,405 describes additively colored glasses and optical bleaching treatments which may be used to permanently modify the color thereof. These glasses may be photochromic glasses or simply colored glasses containing both silver halide and an additional metallic silver coloring phase.

A discussion of the proposed mechanism of color modification in these glasses is provided by N. F. Borrelli et al., "Photoinduced Optical Anisotrophy and Color Adaptation in Silver-Containing Glasses," Appl. Phys. Lett., 34 (6) pages 375–397 (1979). A typical additively colored glass described in that study, which demonstrates strong response to optical bleaching treatments of the kind described, is a silver halide-containing photochromic glass which has been permanently colored by a silver ion-exchange treatment to exchange silver into a surface layer on the glass.

A marked similarity can be observed between photochromic glasses colored by a silver ion exchange treatment as above described and photochromic glasses colored by thermal reduction treatments. The two surface-colored glasses exhibit very similar optical absorption spectra, presumably indicating that a similar silver structure is present in both types of glasses.

Surprisingly, however, optical bleaching treatments which are effective to modify the surface colors of additively-colored (e.g. ion-exchanged) glasses have not been found effective to bleach or otherwise usefully alter the color of glasses which have been tinted or colored using thermal reduction treatments. This is particularly unexpected in view of the probability that the observed coloration in both cases is due to the presence of light-absorbing silver particles on or near silver halide crystallites in the glass.

It is therefore a principal object of the present invention to provide a method for modifying the surface coloration of photochromic glasses wherein the surface color has been generated by thermal reduction treatments.

Other objects and advantages of the invention will become apparent from the following description thereof.

SUMMARY OF THE INVENTION

The present invention provides a method for modifying the surface coloration of additively colored silver halide-containing photochromic glasses, and particularly colored glasses produced by a thermal reduction treatment, which has proven effective to permanently modify the surface coloration of the glass. The method of the invention has particular utility because it may be applied to all or selected portions of individual glass products or groups thereof, permitting a high degree of control over the regions of glass to be modified by the treatment.

The invention is founded in part on a new understanding of a mechanism by which the high resistance to optical bleaching of certain colored photochromic glasses may be explained. In accordance with that theory, coloration in ion-exchanged silver halide-containing glasses is due to the reduction of the exchanged silver ions by copper in the glass in accordance with the following reaction:

$$Ag^+ + Cu^+ = Ag^\circ + Cu^{+2} \qquad [1]$$

In colored silver halide-containing photochromic glasses produced by thermal reduction treatments, on the other hand, the proposed coloration reaction is as follows:

$$Ag^+ + \tfrac{1}{2}H_2 = Ag^\circ + H^+ \quad [2]$$

The optical bleachability of the former glasses could then be explained by the availability, either in the glass or in the silver halide crystal, of $Cu^{+2}$ for the reverse silver oxidation reaction In the latter case, however, due to the mobility and reactivity of $H^+$, the reverse reaction would be impeded because no oxidizing agents would be available for oxidition and bleaching.

Without being bound by this tentative explanation, the present invention provides a method for treating the latter types of surface-colored glasses which provides an effective yet flexible way to change permanently the surface coloration of the glass. A unique feature of the method is a simultaneous heating/irradiation treatment which permanently alters the absorption characteristics of the glass.

In accordance with the method of the invention, a surface-colored silver halide-containing photochromic glass article is first selected for treatment. This article is typically an article which has been colored by a thermal reduction treatment. The article thus selected is then coincidentally exposed, for an effective time interval, to (i) a source of high energy light and (ii) a heat source. By an effective time interval is meant a time interval of sufficient duration, during exposure of the glass to heat and optical energy, that an irreversible change in the undarkened color of the glass occurs. By high energy light is meant light of high photon energy.

During the interval of coincident exposure of the glass to both heat and light, a gradual progressive change in the undarkened absorption spectrum of the glass is observed. Typically, the relatively strong absorption peaks characteristic of the initially colored glass become less intense and well defined, resulting in a permanen bleached appearance.

Coincident exposure in accordance with the present method does not require that the heating and exposure light begin or end concurrently. Rather, the only requirement is that there be some interval of concurrent heating and exposure. Thus the glass may, if desired, be preheated prior to light exposure or irradiated prior to the onset of heating. However, neither the light exposure or moderate heating alone is effective to cause a significant permanent change in the absorption characteristics of the glass.

Of course, as is well known to those skilled in the art, the heating of photochromic glasses colored bythermal reduction to temperatures above about 450° C. will permanently shift the silver absorption bands toward the violet, resulting in a yellow glass. Thus for purposes of the present invention, the heating step is carried out below 450° C.

While the method of the invention is in principle useful for modifying the color of essentially any additively colored silver halide-containing photochromic glass, it has primary utility for the treatment of surface-colored photochromic glasses produced by a thermal reduction treatment, since tne latter glasses are not amenable to permanent color modification by other means.

DESCRIPTION OF THE DRAWINGS

The invention may be further understood by reference to the drawings wherein.

DETAILED DESCRIPTION

Figure 2:
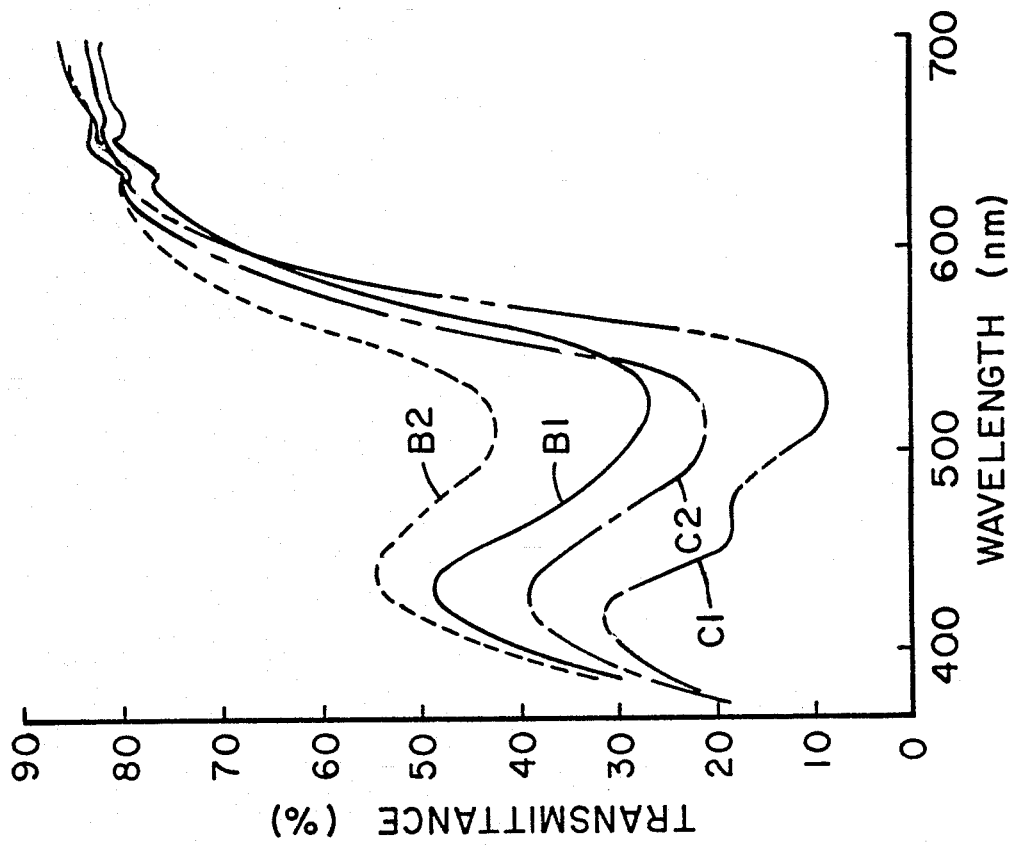
FIG. 2 plots transmittance as a function of wavelength for two surface-colored silver halide-containing photochromic glass articles before and after treatment in accordance with the invention.

While the precise mechanism by which the method of the invention provides color modification in surface-colored silver halide-containing photochromic glasses provided by thermal reduction treatments has not been established, the following tentative explanation is offered. The coloration process in photochromic glasses colored by ion exchange with silver is a silver reduction process involving copper (equation [1]above) wherein $Cu^{+2}$ is retained in or near the silver halide microcrystals in the glass. On the other hand, in coloration by hydrogen reduction (equation [2]above), the resulting hydrogen ion is reactive and likely reacts with other constituents in the glass. There is some evidence, in a resulted reduction phenomenon, that such hydrogen ions will form OH groups in the glass.

Bleaching in these glasses is thought to involve the light-induced ejection of electrons from the absorbing silver metal particles, producing silver ions. However, when trapped holes (e.g., $Cu^{+2}$) generated during the initial coloring process are not available, the internal photoemitted electrons generated by a bleaching energy source are recaptured by silver ions, with the net result that no photolytic dissolution of metallic silver occurs.

In the process of the invention, however, it is theorized that trapped holes such as copper ions are created by the high energy radiation, and that these can trap the photoemitted electrons to complete the oxidation of silver. Thus dissolution of the metallic silver can proceed.

In competition with this bleaching process is the normal process of photochromic darkening, also promoted by the high energy radiation being employed. To minimize this darkening effect, the glass is heated during exposure. This heating is thought to increase the thermal recombination rate so that the rate of formation of new metallic silver absorption sites is reduced.

For effective bleaching of colored photochromic glasses in accordance with the invention, a source of high energy light must be used. By high energy light is meant short-wavelength (ultraviolet) light of an energy of at least about 3 electron volts, corresponding to wavelengths below about 415 nm. This radiation energy is larger than the energy gap of silver halide and is thus effective to achieve the formation of $Cu^{+2}$. The intensity of the source should be sufficient to develop a reasonable steady state population of these ions in order for silver oxidation to occur at a reasonable rate.

The light source utilized to provide the necessary high-energy irradiation is not critical; sources of ultraviolet light such as normally used to induce photochromic darkening may be used. However, due to the preference for high intensity (high wattage) radiation, powerful ultraviolet mercury-xenon arc lamp sources, are particularly preferred.

Optical treatment of these glasses alone, without a coincidental heating of the glass to prevent significant photochromic darkening, is found to have very little permanent effect on the undarkened absorption spectrum of the glass. In contrast, if the glass is heated to a temperature sufficient to prevent photochromic darkening, relatively rapid bleaching and permanent color modification of the surface layer of the glass may be achieved.

Useful heating temperatures will depend somewhat on the intensity of the ultraviolet irradiation employed, but for kilowatt light sources will preferably be in the range of about 200°–400° C., most preferably 250°–350° C. Treatment times will depend in the extent of color modification desired, but may range from as little as 1 hour to 1 or more days of treatment, if desired.

As previously noted, the method of the invention could be used to bleach essentially any additively colored silver halide-containing glass in which hole traps may be generated by ultraviolet exposure. However, the method has principal applicability to the treatment of surface-colored silver halide-containing glasses produced by thermal reduction treatments, and most preferably to glasses of this type containing copper in the composition thereof.

As is known, the use of thermal reduction treatments has wide utility in the treatment of silver halide-containing photochromic glasses to develop surface coloration therein. U.S. Pat. No. 4,240,836, for example, reports several families of glass compositions which can be treated to develop surface coloration therein by this method, and that patent is expressly incorporated herein by reference for a further description of glasses which may be colored by thermal reduction treatments and thus color-modified in accordance with the invention.

Briefly referring to the thermal reduction coloring process as practiced in the prior art, the development of this surface coloration is favored by heat treatments of the photochromic glass at temperatures below 450° C. and preferably not exceeding about 400° C. The reducing environment in which the glass is treated is not critical, but hydrogen-containing atmospheres and particularly atmospheres of forming gas or similar reducing gases may be employed. In general, the most rapid and effective reduction of these glasses for the purpose of coloration is by means of a pure hydrogen atmosphere, which is preferably permitted to flow continuously over the surface of the glass for maximum reduction effect.

Temperatures best suited for generating surface coloration in these glasses will range from about 250°–450° C. As is known, the color of the glass resulting from this treatment depends principally on the temperature at which the treatment is carried out, with the duration of the treatment mainly affecting the depth or intensity of that color.

The invention may be further understood by reference to the following examples, which are intended to be illustrative rather than limiting.

EXAMPLE 1

Photochromic glass samples in the form of ophthalmic lens blanks composed of a commercially available photochromic glass, identified as Corning Code 8111 glass and sold under the trademark PHOTOGRAY EXTRA, are selected for treatment. The approximate composition of this photochromic glass, in weight percent, is about 55.8% $SiO_2$, 6.5% $Al_2O_3$, 18.0% $B_2O_3$, 1.9% $Li_2O$, 4.0% $Na_2O$, 5.8% $K_2O$, 4.9% $ZrO_2$, 2.2% $TiO_2$, 0.24% Ag, 0.20% Cl, 0.13% Br, and 0.011% CuO.

A number of the selected samples, having a thickness of approximately 2 mm, are subjected to a thermal reduction treatment in a flowing hydrogen atmosphere to develop surface coloration therein. The thermal reduction treatment comprises heating the samples at 300° C. in a flowing hydrogen atmosphere for approximately 16 hours.

Following the thermal reduction treatment, examination of the glass samples shows intense surface coloration therein manifested by the development of a strong absorption peak at a wavelength of about 525 nm in the glass. This absorption peak is not significantly changed by further conventional treatment, either by exposure of the glass to strong optical bleaching radiation or by moderate heating alone.

The surface-colored samples produced as described are next heated to a temperature of approximately 350° C. on a hot plate, and then exposed, while still being heated, to the optical output of a mercury-xenon arc lamp. The lamp used is an Oriel Model 8075 arc lamp having a stated power of about 1000 watts. The concurrent heating/bleaching treatment is continued for about four hours.

Glass samples are removed from the hot plate after one, two and four hours of treatment and analyzed for absorption. Samples removed after one hour of exposure show a readily apparent change in absorption, with further progressive changes being observed throughout the remainder of the treatment.

Figure 1:
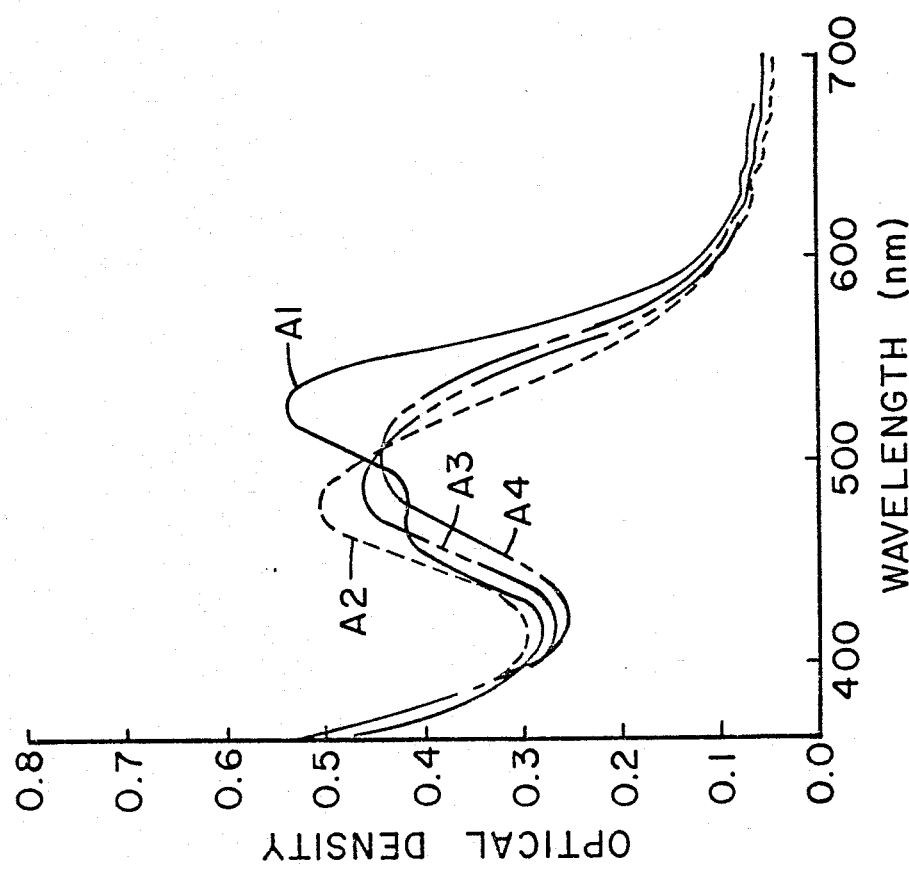
FIG. 1 plots optical density as a function of wavelength for a surface-colored silver halide-containing photochromic glass composition treated in accordance with the invention as a function of treatment time.

FIG. 1 of the drawings sets forth spectral optical density curves for representative glass samples prior to treatment and after treatment for one, two and four hours. The curves are plotted over the wavelength range of about 360–700 nm. Curve A1 shows the absorption characteristics of the glass prior to treatment, while curves A2, A3, and A4 correspond to optical density spectra determined on the samples after one hour, two hours, and four hours of treatment, respectively.

As is evident from a study of FIG. 1, bleaching under the conditions described causes a shift in the absorption peak wavelength, as well as a significant reduction in the intensity of the absorption, within a one-hour treatment interval. Further reductions in the intensity of the original absorption continue to occur over the 4-hour interval of the test.

EXAMPLE 2

A number of photochromic glass samples consisting of Corning Code 8111 glass ophthalmic lens blanks such as treated in Example 1 are selected for processing.

As described in Example 1, each of these samples is first subjected to a thermal reduction treatment to develop surface coloration in the glass. A first group of samples is treated by exposing them to a flowing hydrogen atmosphere at a temperature of about 275° C. for 16 hours, while a second group of samples is treated under the same conditions and for the same time but at 350° C.

Following this treatment the glass samples are analyzed to record their spectral absorption characteristics. FIG. 2 of the drawings plots the transmittance of representative glass samples so treated over the wavelength range 400–700 nm. In FIG. 2, curve B1 shows the transmission of a typical sample heated at 275° C., while curve C1 shows the transmittance of a sample treated at 350° C.

Each of these samples is next subjected to thermal bleaching as described in Example 1 above to determine the effect of bleaching on the transmission characteristics thereof. Each sample is placed on a hot plate operating at 350° C. and exposed to bleaching radiation from the source described in Example 1 for 16 hours. Thereafter, the samples are removed from the hot plate and spectrally analyzed.

The resulting spectral transmission curves for each of two samples thus treated are also shown in FIG. 2 of the drawings. Curve B2 shows the transmittance of the glass shown in Curve B1 after bleaching under the described conditions, while Curve C2 show the transmittance of the sample of Curve C1 after the bleaching treatment.

As is evident from a study of FIG. 2, the shape of the spectral transmittance curves for each of the two treated samples is generally the same before and after the bleaching treatment, although with some shift of peak absorption to shorter wavelengths. However, a substantial reduction in absorption evidenced by a large increase in transmittance at the peak absorption wavelength is observed in both cases.

EXAMPLE 3

Ophthalmic lens blank samples of Code 8111 photochromic glass as described in Example 1 are selected for treatment. These samples are first subjected to selected thermal reduction treatments to develop surface coloration thereon. The samples are divided into three groups, and each of the groups is given a thermal reduction treatments at a different temperature. The first group is treated in flowing hydrogen at 275° C. for 16 hours, while the second and third groups are similarly treated for the same time at 350° C. and 400° C., respectively.

Figure 3:
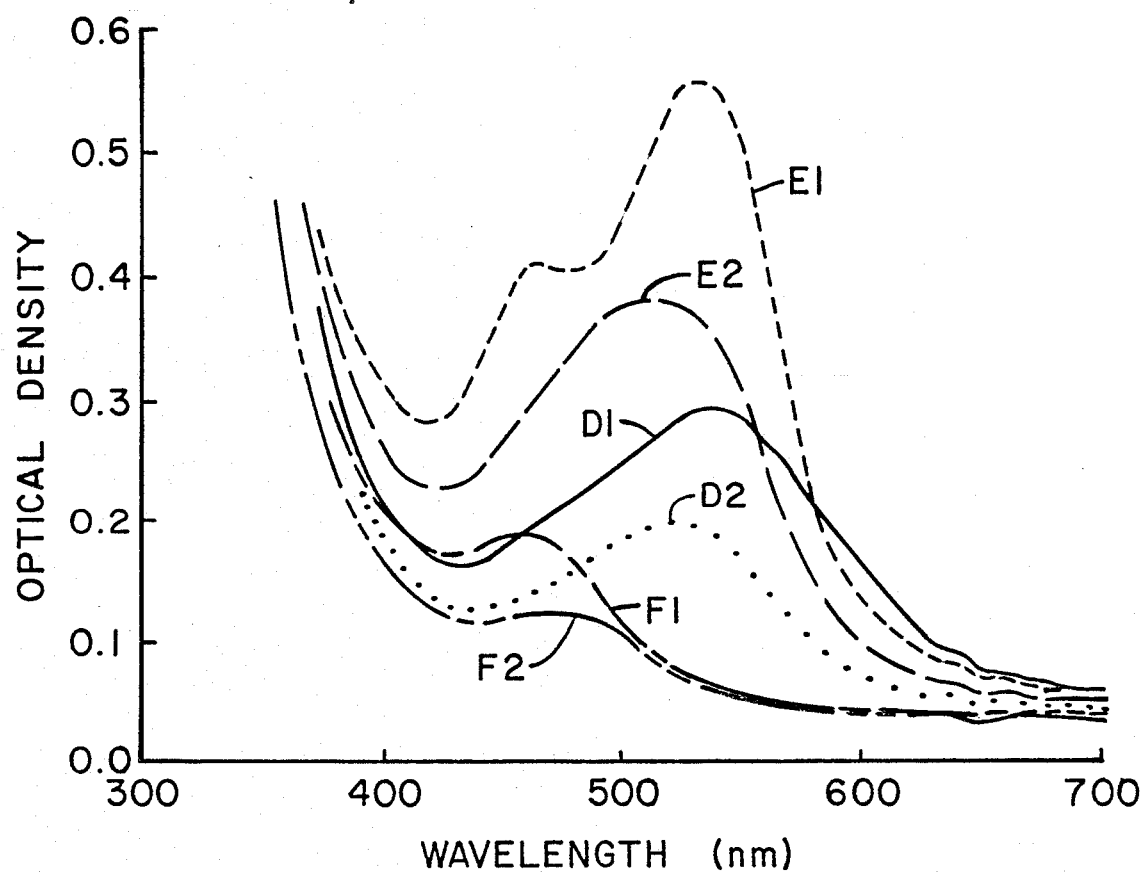
FIG. 3 plots optical density as a function of wavelength for three silver halide-containing photochromic glass articles before and after treatment in accordance with the invention.

FIG. 3 of the drawings sets forth optical density curves for each of the three sample types produced by coloring thermal reduction treatments as above described. The optical density curves are plotted over the wavelength range of about 360–700 nm. In FIG. 3, Curve D1 shows the optical density curve for a sample colored at 275° C., while Curves E1 and F1 show optical density curves for samples colored at 350° C. and 400° C., respectively.

Each of the samples thus provided is next subjected to a thermal bleaching treatment at a moderated temperature. Thus the samples are placed on a hot plate operating at 250° C., and while being heated are irradiated with the arc source described above in Example 1 for a treatment time of approximately 16 hours.

Following the 16-hour bleaching treatment above described, the samples are again spectrally analyzed to determine the effects of the treatments on the optical absorption thereof. FIG. 3 of the drawings shows the post-treatment optical density curves for each of these glasses. Curve D2 shows the post-treatment optical density spectrum of the glass of Curve D1, while Curves E2 and F2 show post-treatment optical density spectra for the glasses of Curves E1 and F1, respectively. In all three instances, the post-bleaching curves show a significant reduction in absorption in the glasses, with only a slight shift in peak absorption wavelength.

As the foregoing examples suggest, the method of the invention is particularly suited to the manufacture of surface-colored photochromic glass products wherein bleaching of the color produced by thermal reduction treatments can be carried out on a selective or localized basis. Thus, for example, surface-colored photochromic glass articles could be heat treated while being exposed selectively to a high-energy light source by masking the article during exposure to the light, so that only unmasked portions of the article would be bleached. Alternatively, differential heating of the article by known infrared optical heating devices could be employed to promote localized bleaching of the glass during a general exposure to high energy light. Thus the foregoing examples are merely illustrative of glass materials and procedures which may be employed in the practice of the invention within the scope of the appended claims.

We claim:

1. A method for optically bleaching a surface-colored photochromic glass article which comprises the steps of:
    selecting for treatment a surface-colored silver halide-containing photochromic glass;
    heating the surface colored photochromic glass to an elevated temperature of at least about 200° C.; and
    exposing the surface colored photochromic glass to short wavelength light of an energy of at least about 3 electron volts while at the elevated temperature; said exposure being for a time at least sufficient to irreversibly bleach the undarkened color of the surface-colored photochromic glass.

2. A method in accordance with claim 1 wherein the surface-colored photochromic glass article is composed of a silver halide-containing silicate glass having a composition which includes copper.

3. A method in accordance with claim 2 wherein the surface-colored photochromic glass article has a colored glass surface later wherein coloration has been developed by a thermal reduction treatment.

* * * * *